United States Patent
Itoh

(10) Patent No.: US 10,243,260 B2
(45) Date of Patent: Mar. 26, 2019

(54) ANTENNA UNIT, COMMUNICATIONS SYSTEM WITH ANTENNA UNIT, AND METHOD OF PRODUCING ANTENNA UNIT

(71) Applicant: Naohiro Itoh, Hyogo (JP)

(72) Inventor: Naohiro Itoh, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 15/479,899

(22) Filed: Apr. 5, 2017

(65) Prior Publication Data
US 2017/0317403 A1    Nov. 2, 2017

(30) Foreign Application Priority Data

Apr. 27, 2016  (JP) .................. 2016-089926

(51) Int. Cl.
*H01Q 1/24* (2006.01)
*H01Q 7/08* (2006.01)
*H04B 5/00* (2006.01)

(52) U.S. Cl.
CPC .............. *H01Q 1/243* (2013.01); *H01Q 7/08* (2013.01); *H04B 5/0031* (2013.01); *H04B 5/0037* (2013.01)

(58) Field of Classification Search
CPC ........ H01Q 1/243; H01Q 7/08; H04B 5/0031; H04B 5/0037
USPC .......................................... 343/702
See application file for complete search history.

(56) References Cited

U.S. PATENT DOCUMENTS

| | | | | |
|---|---|---|---|---|
| 7,511,679 | B2* | 3/2009 | Araki | G04G 21/04 343/718 |
| 9,306,267 | B2* | 4/2016 | Liang | H01Q 1/243 |
| 9,337,528 | B2* | 5/2016 | Hammond | H01Q 1/243 |
| 9,680,202 | B2* | 6/2017 | Irci | H01Q 1/243 |
| 2016/0028160 | A1 | 1/2016 | Otsuki | |

FOREIGN PATENT DOCUMENTS

| | | |
|---|---|---|
| JP | 2014-123858 | 7/2014 |
| JP | 2014-195138 | 10/2014 |

* cited by examiner

*Primary Examiner* — Brian K Young
(74) *Attorney, Agent, or Firm* — Oblon, McClelland, Maier & Neustadt, L.L.P.

(57) ABSTRACT

An antenna unit includes an antenna prepared by winding conducting wire around a magnetic body. The antenna unit also includes a metal housing to accommodate the antenna. The metal housing includes a first cut-out to allow a magnetic field generated by the antenna to pass through the metal housing.

17 Claims, 15 Drawing Sheets

ANTENNA UNIT, COMMUNICATIONS SYSTEM WITH ANTENNA UNIT, AND METHOD OF PRODUCING ANTENNA UNIT

CROSS-REFERENCE TO RELATED APPLICATION

This patent application is based on and claims priority pursuant to 35 U.S.C. § 119(a) to Japanese Patent Application No. 2016-089926, filed on Apr. 27, 2016, in the Japan Patent Office, the entire disclosure of which is hereby incorporated by reference herein.

BACKGROUND

Technical Field

Embodiments of the present disclosure relate to an antenna unit, a communication system with the antenna unit, and a method of producing the antenna unit.

Related Art

Communication and power supply capabilities of proximity magnetic field coupling systems built into near field communication (NFC) devices such as mobile phones, smart phones, wearable terminals, etc., noncontact-type integrated circuit (IC) card cellular phones (e.g., a Felica™ card produced by SONY Corporation), and low-power wireless power supplies are becoming popular.

With these types of terminals a premium is placed on smooth integration into daily life by focusing on the user experience (UX) while much emphasis is placed on device design. When the design is valued, a metal housing is sometimes favored over resin or plastic housings.

SUMMARY

One aspect of the present disclosure provides a novel antenna unit that includes an antenna composed of a magnetic body and a conducting wire wound around the magnetic body. The novel antenna unit also includes a metal housing to accommodate the antenna. The metal housing includes a cut-out to allow a magnetic field generated by the antenna to pass through the metal housing uninhibited.

Another aspect of the present disclosure provides a novel communication system that includes the antenna unit and a communication device connected to the antenna unit to communicate with an external device.

Another aspect of the present disclosure provides a novel method of producing an antenna unit. The method includes winding conducting wire around a magnetic body multiple times at a prescribed pitch to prepare an antenna, installing the antenna in a metal housing at a prescribed position, and forming a first cut-out in the metal housing by cutting off a prescribed top face portion of the metal housing along the magnetic body in a first direction to allow a magnetic field generated by the antenna to pass through the metal housing uninhibited.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
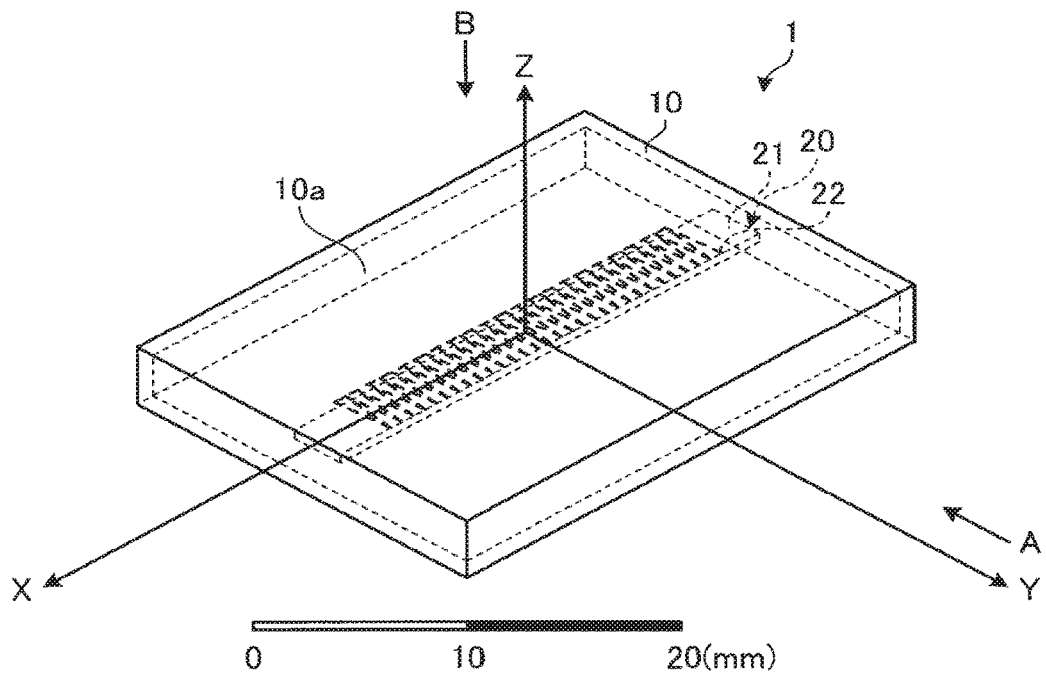
FIG. 1 is a diagram schematically illustrating an antenna unit of a comparative example.

Referring now to the drawings, wherein like reference numerals designate identical or corresponding parts throughout the several views thereof, and in particular to FIGS. 5 to 20, an antenna unit, a communication system, and an antenna unit producing method are hereinbelow described in detail.

Initially, a first embodiment of the present disclosure is described with reference to FIGS. 5 to 8. In general, technologies utilizing a magnetic coupling system, such as near field communications (NFC), wireless power supply, etc., require an antenna. In terms of design and durability, smartphones and wearable terminals frequently need to employ a metal housing. However, when an antenna portion of a conventional loop antenna overlaps with metal, since the loop antenna is affected by the metal, performance of the loop antenna is extremely degraded. To solve such a problem, according to this embodiment of the present disclosure, a slender spiral antenna prepared by winding conducting wire around a magnetic body is used as described herein below. In such a situation, in view of implementation and being waterproof and dust-proof as well, it is preferable to dispose the antenna in a metal housing. However, when the antenna is placed inside the metal housing, a magnetic field generated by the antenna accumulates on an inner face of the metal housing, thereby causing an eddy current therein. Then, due to the eddy current, since a magnetic field having an opposite direction to the magnetic field generated by the antenna appears, the magnetic field generated by the antenna no longer spreads out from the metal housing, thereby degrading performance of the antenna. According to this embodiment of the present disclosure, an antenna unit can avoid deterioration of performance of an antenna by suppressing the eddy current as described herein below. Before describing this embodiment of the present disclosure, an existing antenna unit is briefly described with reference to FIGS. 1 to 4.

Figure 2:
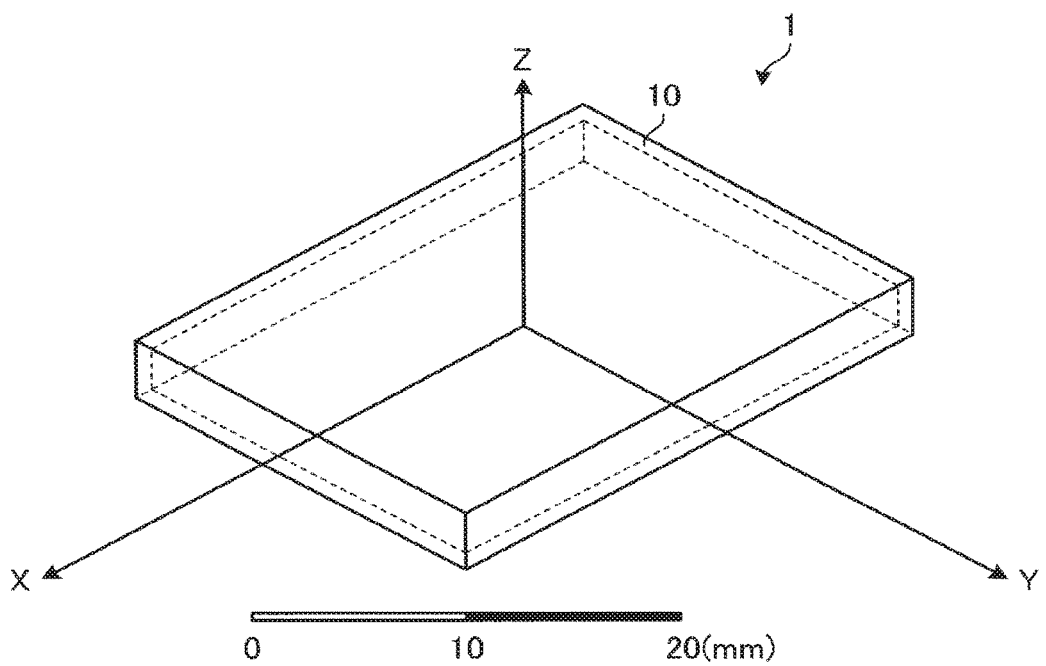
FIG. 2 is a diagram schematically illustrating a metal housing employed in the antenna unit of the comparative example of FIG. 1.

FIG. 1 schematically illustrates an antenna unit of a comparative example. FIG. 2 schematically illustrates a metal housing employed in the antenna unit of the comparative example of FIG. 1. As illustrated in FIGS. 1 and 2, a XYZ rectangular coordinate system is applied to the antenna unit 1, and the antenna unit 1 or the like is herein below described with reference to the XYZ rectangular coordinate system. The antenna unit of the comparative example of FIG. 1 employs a proximity magnetic field coupling system and includes a metal housing 10 that accommodates an antenna 20 composed of a magnetic body 21 and a conducting wire 22 wound around magnetic body 21 therein.

The magnetic coupling antenna unit generally executes communication with an antenna unit of a counterpart device by magnetically coupling with a magnetic flux generated by the counterpart antenna unit, and is accordingly different from a resonant antenna unit. That is, the resonant antenna unit transmits and receives radio waves by incurring resonance at a prescribed frequency. For this reason, the range of the resonant antenna unit is from about a few meters to about a few kilometers or more. By contrast, the range of the magnetic coupling antenna unit is about 1 m or less, for example.

In other words, the magnetic coupling antenna unit is categorized as either a short-distance communication system or a proximity communication system. The magnetic coupling antenna unit transmits and receives a signal having a frequency of about 13.56 MHz.

The magnetic body 21 is made of sintered ferrite and has a rectangular solid-planar shape having lengths of about 5 mm in a short side direction (i.e., a direction of the Y axis) thereof and about 28 mm in a longitudinal direction (i.e., a direction of the X axis) thereof, for example. The size of such a magnetic body 21 is but one example; alternatively, it can be a cube having the same size in directions of short and long axes (i.e., the directions of the Y and X axes) and a thickness (i.e., a direction of the Z axis) thereof.

The magnetic body 21 can optionally be shaped in accordance with either a size or a shape and the like of a space to implement the antenna 20 and a communication coverage needed for the antenna 20 to function as well. Material of the magnetic body 21 is not limited to the sintered ferrite, and may be made of so-called ferromagnetic material, such as iron, nickel, manganese, zinc, alloys of these materials, etc.

Further, the magnetic body 21 may be a flexible sheet member (e.g., a flexible sheet), the shape of which can be freely changed to fit the shape of a housing that accommodates the magnetic body 21. Such a flexible sheet can be made of a complex magnetic substance prepared by dispersing magnetic powder in resin and making these materials into a sheet state. Otherwise, the flexible sheet may be a composite magnetic sheet prepared by first pasting a protection member onto a planar magnetic body 21 and then dividing the planar magnetic body 21 into small pieces to obtain the necessary flexibility.

The conducting wire 22 is wound around the magnetic body 21 multiple times in a short side direction (i.e., a direction of the Y axis) to form a coil extended in a longitudinal direction thereof (i.e., a direction of the X axis). The number of turns of the conducting wire 22 wound around the magnetic body 21 is about thirty (i.e., thirty turns) in this embodiment of the present disclosure. The conducting wire 22 may be copper wire, for example. With such a configuration, the magnetic coupling antenna unit 100 of this embodiment of the present disclosure executes communications and charging by using a magnetic field emitted primarily in the direction of the Z axis. The number of turns and the pitch of the conducting wire 22 employed in this embodiment of the present disclosure are typical examples, and can be selected as desired when a size of the antenna 20 (i.e., the magnetic body) or the like is changed. Further, both ends of the conducting wire 22 are connected to a communication device of a communication system that executes communication by using the antenna 20. With this, current flown through the conducting wire 22 under control of the communication device causes and extends a magnetic field from the antenna 20. The communication device then executes communications with an external device and charges the external device, for example.

As illustrated in FIGS. 1 and 2, the metal housing 10 is a box that contains the antenna 20 therein. The metal housing 10 of this embodiment of the present disclosure has a rectangular shape. Specifically, a length in a short side direction (i.e., a direction of the Y axis) is about 22 mm, a length in a longitudinal direction (i.e., a direction of the X axis) is about 30 mm, and a thickness (i.e., a direction of the Z axis) is about 5 mm, for example. These sizes (i.e., the lengths and the thickness) of the metal housing 10 are typical examples, and can be altered appropriately depending on the size of the antenna 20.

Further, as also illustrated in FIG. 1, the antenna 20 is disposed at a middle of the metal housing 10. That is, at a center of the metal housing 10 in each of longitudinal and short sides, a center of the antenna 20 is placed. The longitudinal directions of the magnetic body 21 of the antenna 20 and the metal housing 10 are the same to each other as well.

Figure 3:
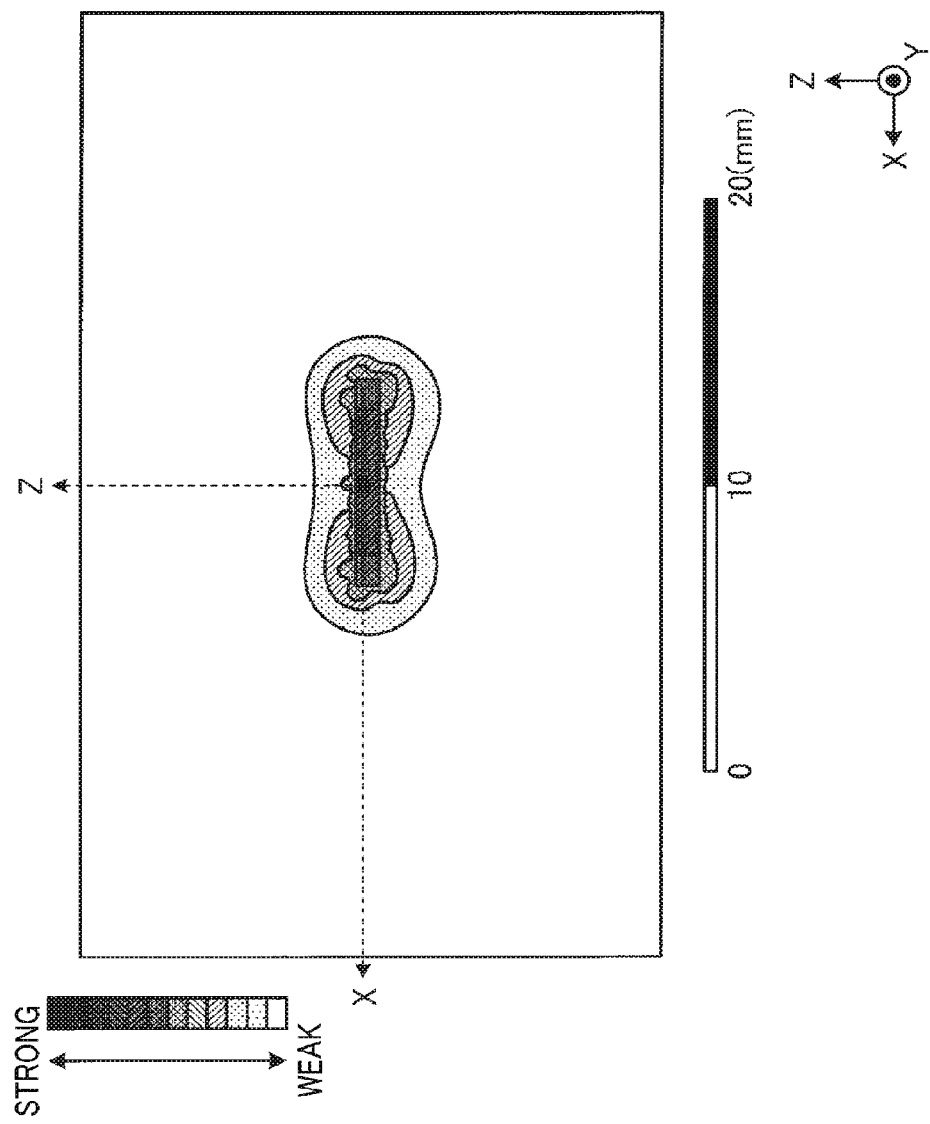
FIG. 3 is a diagram schematically illustrating a result of simulation of a magnetic field generated around the antenna unit of the comparative example of FIG. 1.

FIG. 3 schematically illustrates a result of simulation of a magnetic field generated around the antenna unit of the comparative example. FIG. 3 is a view taken from one side of the antenna unit 1 in a direction of the Y axis, i.e., a direction A illustrated in FIG. 1. The origin of the XYZ coordinate system of FIG. 3 is located at the same position as the origin of the XYZ coordinate system of FIG. 1.

As illustrated there, FIG. 3 schematically illustrates a result of simulation of distribution of strength of a magnetic field surrounding the antenna unit 1. A color bar is indicated on a left in FIG. 3 and represents that the darker the color, the stronger the magnetic field. The color bar also represents that the thinner the color, the weaker the magnetic field as well. A practical color bar is colored, and represents that the closer the color to red, the stronger the magnetic field, and the closer the color to blue, the weaker the magnetic field, for example.

As illustrated in FIG. 3, it is understood therefrom that in the antenna unit 1 of the comparative example, since the antenna 20 is placed inside the metal housing 10 and is accordingly surrounded by all of faces of the metal housing 10, a magnetic field is scarcely extended to an outside of the antenna unit 1.

Figure 4:
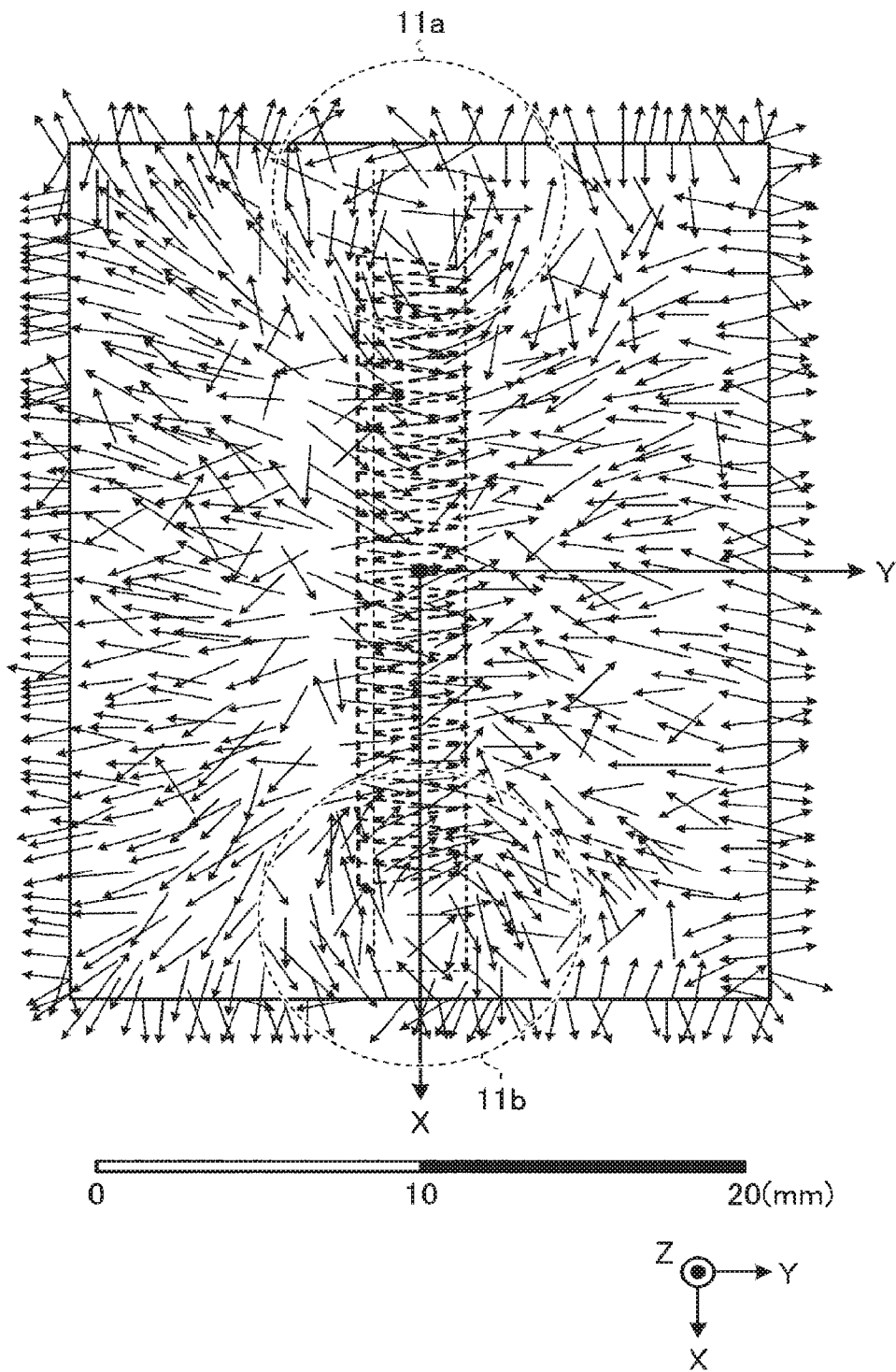
FIG. 4 is a diagram schematically illustrating a result of simulation of current density obtained around the antenna unit of the comparative example of FIG. 1.

FIG. 4 also schematically illustrates a result of simulation of density of current generated in (the metal housing 10 of) the antenna unit 1 of the comparative example. FIG. 4 is a view taken from above the antenna unit 1 in a direction of the Z axis, i.e., a direction B illustrated in FIG. 1. The origin of the XYZ coordinate system of FIG. 4 is located at the same position as the origin of the XYZ coordinate system of FIG. 1 again. In the drawing, however, reference numerals are not assigned to the antenna and the metal housing, and are the same as those as illustrated in FIG. 1, respectively.

When current density appearing in a top face 10a of the metal housing 10 is checked with reference to the simulation result illustrated in FIG. 4, an eddy of a current (i.e., an eddy current) is found on each face of the metal housing 10 near both ends of the antenna 20 (e.g., top and bottom sections 11a and 11b of the magnetic body 21 in FIG. 4), respectively. The eddy current weakens the magnetic field.

In other words, as mentioned earlier, when the antenna 20 is disposed in the metal housing 10 surrounded by all of the faces thereof (i.e., six faces), a magnetic field generated from the antenna 20 accumulates on inner faces of the metal housing, thereby generating the eddy current. Consequently, due to the eddy current, another magnetic field occurs and extends in an opposite direction to the magnetic field originated from the antenna 20 (i.e., a magnetic field used to execute communications and charging). As a result, the magnetic field generated from the antenna 20 is rarely released to the outside of the metal housing 10, thereby degrading performance of the antenna as expected. By contrast, however, according to various embodiments of the present disclosure, the magnetic field generated from the antenna is preferably released to the outside of the metal housing, because one or more slits are formed in the metal housing as described herein below. That is, because the eddy current is interrupted as described herein below, performance of the antenna of the antenna unit is not degraded and is maintained.

Figure 5:
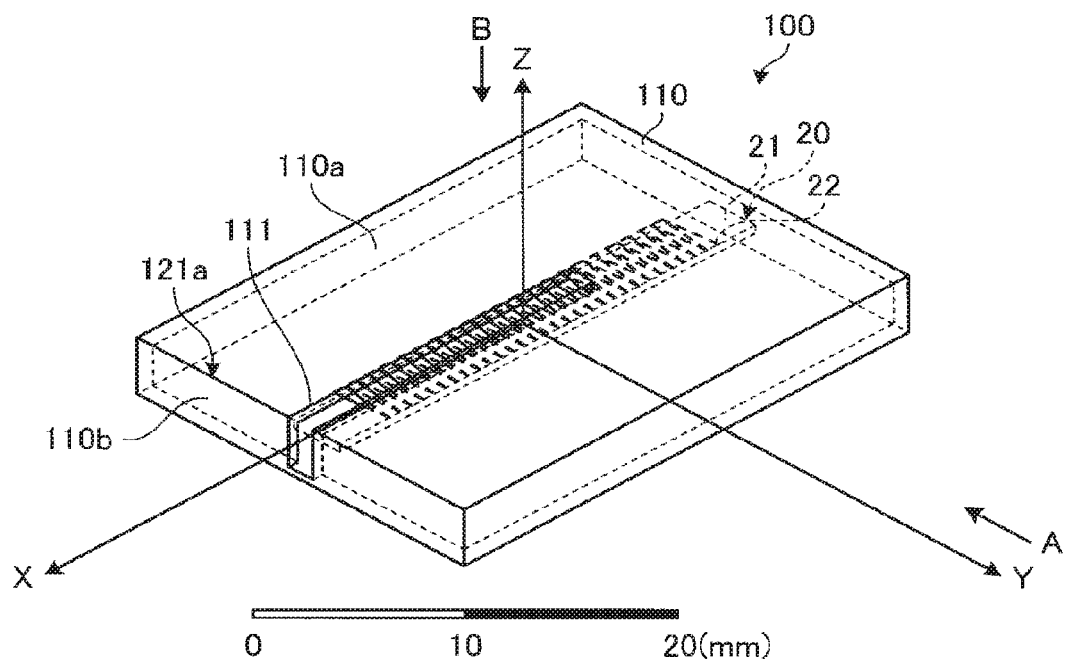
FIG. 5 is a diagram schematically illustrating an exemplary antenna unit of a first embodiment of the present disclosure.
Figure 6:
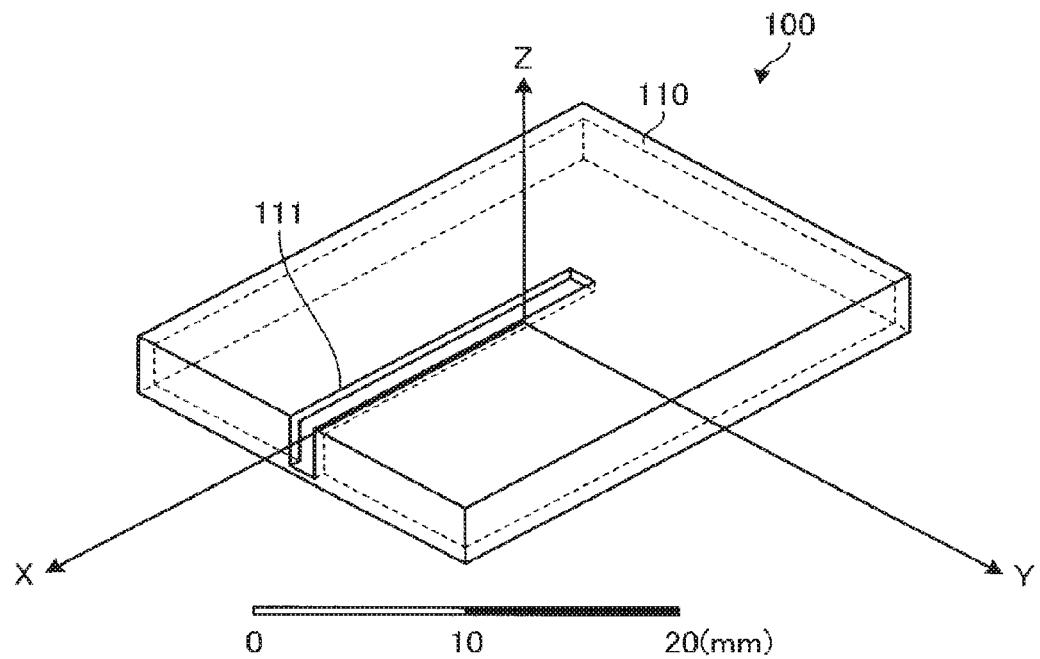
FIG. 6 is a diagram schematically illustrating an exemplary metal housing employed in the antenna unit of the first embodiment of the present disclosure.

Now, antenna units of various embodiments of the present disclosure are described in detail with reference to FIGS. 5 through 20. Initially, an antenna unit 100 of a first embodiment of the present disclosure is described with reference to FIGS. 5 and 6. FIG. 5 schematically illustrates the antenna unit of the first embodiment of the present disclosure. FIG. 6 also schematically illustrates an exemplary metal housing employed in the antenna unit of the first embodiment of the present disclosure. As illustrated in FIGS. 5 and 6, a XYZ rectangular coordinate system is applied to the antenna unit 100, and the antenna unit 100 or the like is herein below described with reference to the XYZ rectangular coordinate system. As illustrated there, the antenna unit 100 of FIG. 5 employs a proximity magnetic field coupling system and includes a metal housing 110 and an antenna 20 composed of a magnetic body 21 and a conducting wire 22 wound around the magnetic body 21 each accommodated in the metal housing 110 as similar to the antenna unit 1 of the comparative example. However, since a construction and operation of the antenna 20 are the same to those of the antenna unit 1 of the comparative example, description of the antenna 20 is herein below omitted.

As illustrated in FIGS. 5 and 6, the metal housing 10 is a box that contains the antenna 20 therein. Specifically, the metal housing 10 of this embodiment of the present disclosure has a rectangular shape such that a length in a short side direction (i.e., a direction of the Y axis) is about 22 mm, a length in a longitudinal direction (i.e., a direction of the X axis) is about 30 mm, and a thickness (i.e., a direction of the Z axis) is about 5 mm, for example. However, these sizes (e.g., lengths) of the metal housing 10 are typical examples, and can be altered appropriately depending on the size of the antenna 20 again.

As illustrated in FIG. 5, the antenna 20 of this embodiment of the present disclosure is disposed at a middle of the metal housing 110. That is, at a center of the metal housing 110 in both longitudinal and short side directions, a center of the antenna 20 is placed. Further, the longitudinal directions of the magnetic body 21 of the antenna 20 and the metal housing 110 are the same as well.

The metal housing 110 has a slit 111 (i.e., a first cut-out) extended in the direction of the X axis orthogonal to a direction, in which the conducting wire 22 is wound (i.e., the direction of the Y axis) to let a magnetic field generated from the antenna 20 pass through the metal housing 110. Specifically, as illustrated in FIGS. 5 and 6, the slit 111 is firstly prepared by cutting off a plane of the metal housing 110 (i.e., a top face 110a of the metal housing 110) facing a top face (i.e., a prescribed face) of the magnetic body 21 in the direction of the X axis from an outer edge 121a of the metal housing 110. The slit 111 is secondly prepared by downwardly cutting off a side face 110b of the metal housing 110 from the outer edge 121a in the direction of the Z axis. With this, a magnetic field generated from the antenna 20 can be emitted in the direction of the Z axis without accumulating on an inner face of the metal housing 110. A length of the slit 111 formed in the top face 110a of the metal housing 110 in the longitudinal direction (i.e., the direction of the X axis) is about 19 mm, and a length (or a width) thereof in the short side direction (i.e., the direction of the Y axis) is about 1 mm, for example. The outer edge 121a corresponds to a first outer edge in the present disclosure.

This means that when the metal housing 110 is viewed both from above (i.e., in a positive direction of the Z axis) and horizontally (in a positive direction of the X axis), the antenna 20 can partially appear through the slit 111. The above described direction (the direction of the X axis) perpendicular to a direction, in which the conducting wire 22 is wound (i.e., the direction of the Y axis), corresponds to a first direction intersecting (or perpendicular to) the direction, in which the conducting wire is wound, according to the present disclosure. Further, the slit 111 is also one example of a first cut-out in the present disclosure.

Figure 7:
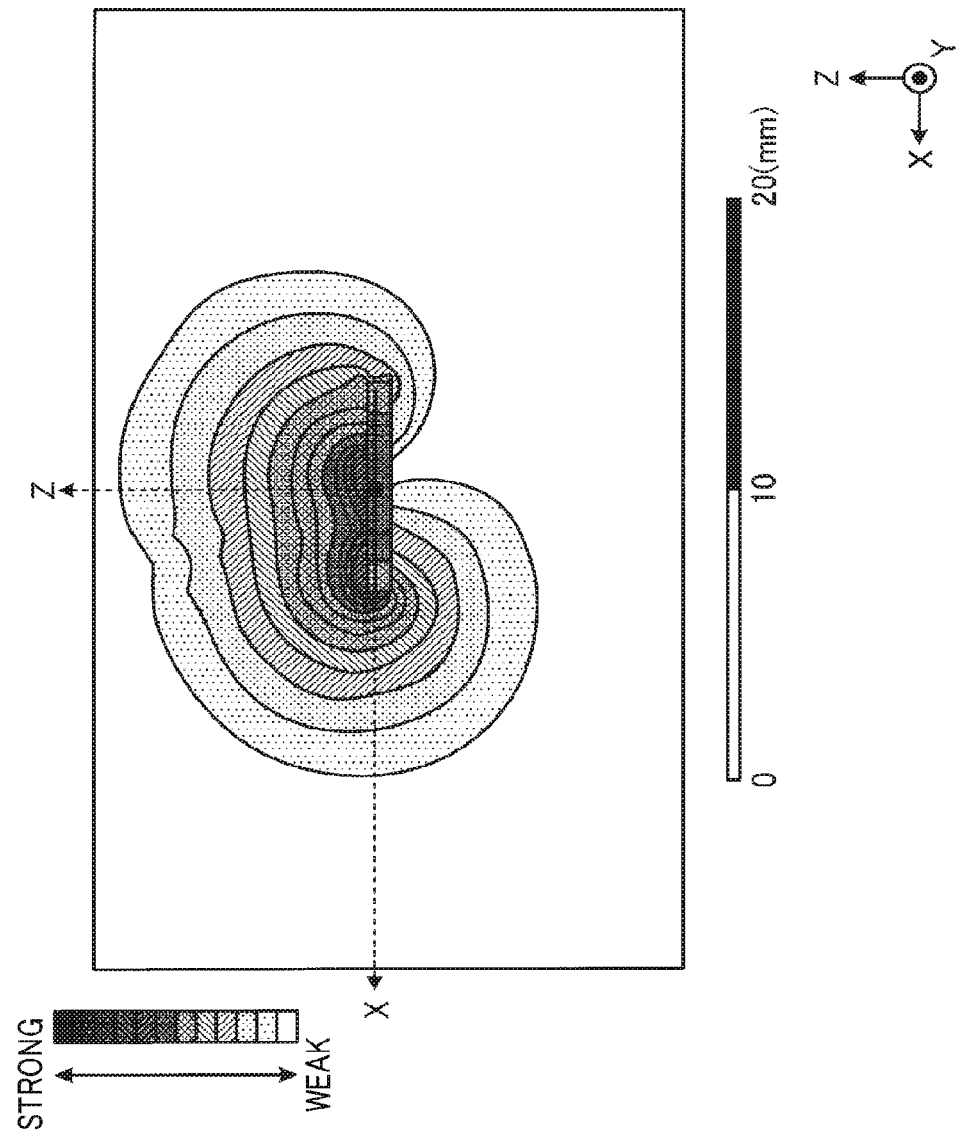
FIG. 7 is a diagram schematically illustrating a result of simulation of a magnetic field generated around the antenna unit of the first embodiment of the present disclosure.

FIG. 7 schematically illustrates a result of simulation of a magnetic field generated around the antenna unit according to the first embodiment of the present disclosure. FIG. 7 is a view taken from a side of the antenna unit 100 in the direction of the Y axis, i.e., the direction A in FIG. 5. The origin of the XYZ coordinate system of FIG. 7 is located at the same position as the origin of the XYZ coordinate system of FIG. 5.

As illustrated there, FIG. 7 schematically illustrates a distribution of strength of the magnetic field surrounding the antenna unit 100 as a simulation result. Similar to FIG. 3, a color bar is also indicated on the left in FIG. 7 and represents that the darker the color, the stronger the magnetic field. In addition, the thinner the color, the weaker the magnetic field as well. Hence, when the antenna unit 100 is compared to the antenna unit 1 of the comparative example with reference to the distributions of strength of the magnetic field illustrated in FIGS. 3 and 7, respectively, it can be seen that because the slit 111 is formed in the antenna unit 100, the magnetic field spreads out to an outside of the metal housing 110 in this embodiment of the present disclosure.

Figure 8:
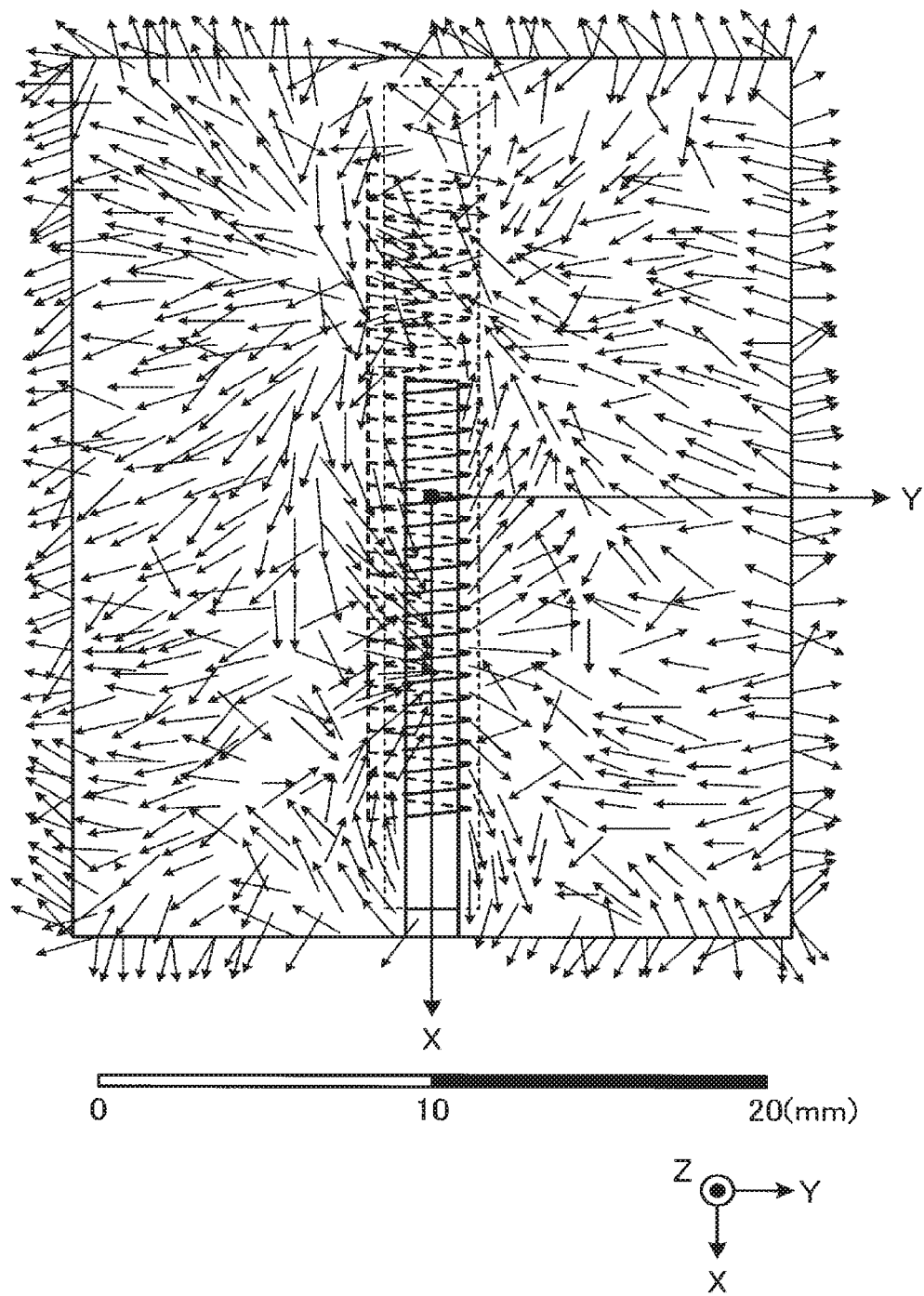
FIG. 8 is a diagram schematically illustrating a result of simulation of current density appearing around the antenna unit of the first embodiment of the present disclosure.

FIG. 8 schematically illustrates a result of simulation of a current density obtained around the antenna unit 100 according to the first embodiment of the present disclosure. FIG. 8 is a view taken from above the antenna unit 100 in a direction of the Z axis, i.e., a direction B illustrated in FIG. 5. The origin of the XYZ coordinate system of FIG. 8 is located at the same position as the origin of the XYZ coordinate system of FIG. 5. In FIG. 8, reference numerals are not assigned to the antenna and the metal housing, but are the same as those as illustrated in FIG. 5, respectively.

When the current density appearing on a top face 110a of the metal housing 110 is checked with reference to the simulation result illustrated in FIG. 8, it is found that an eddy current is interrupted by the slit 111 on the face of the metal housing 110 located near the edge of the antenna 20, at which the slit 111 is formed (i.e., a bottom side of the magnetic body 21 in FIG. 8). That is, because current flows without generating a vortex, degradation of performance of the antenna 20 generally caused by the eddy current can be avoided.

In this way, according to this embodiment of the present disclosure, because the metal housing 110 is cut off thereby forming the slit 111 in the antenna unit 100, the magnetic field generated from the antenna 20 can pass through the metal housing 110 toward the outside of the metal housing 110 even if the antenna 20 is contained in the metal housing 110. That is, loops of the eddy current caused by the magnetic field that accumulates in the inner faces of the metal housing 110 are subdivided, thereby blocking the eddy current. For this reason, the metal housing 110 can be employed without degrading performance of the antenna 20 and increasing the work necessary for producing the antenna unit as well, while maintaining unity of design.

A second embodiment of the present disclosure is now described with reference to FIGS. 9 to 12. As described earlier, in the antenna unit 100 of the first embodiment of the present disclosure, the slit 111 is only formed by cutting off the top face 110a of the metal housing 110 in the direction of the X axis from the outer edge 121a thereof. By contrast, according to the second embodiment of the present disclosure, an antenna unit additionally includes a slit extended in the direction of the Y axis in a top face of a metal housing.

Figure 9:
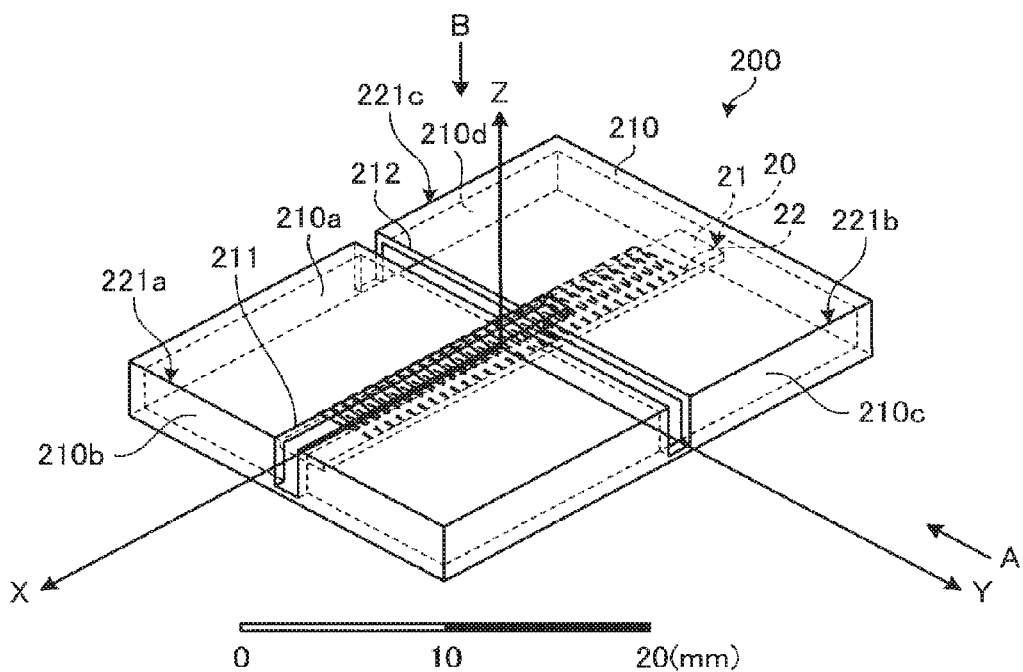
FIG. 9 is a diagram schematically illustrating an exemplary antenna unit of a second embodiment of the present disclosure.
Figure 10:
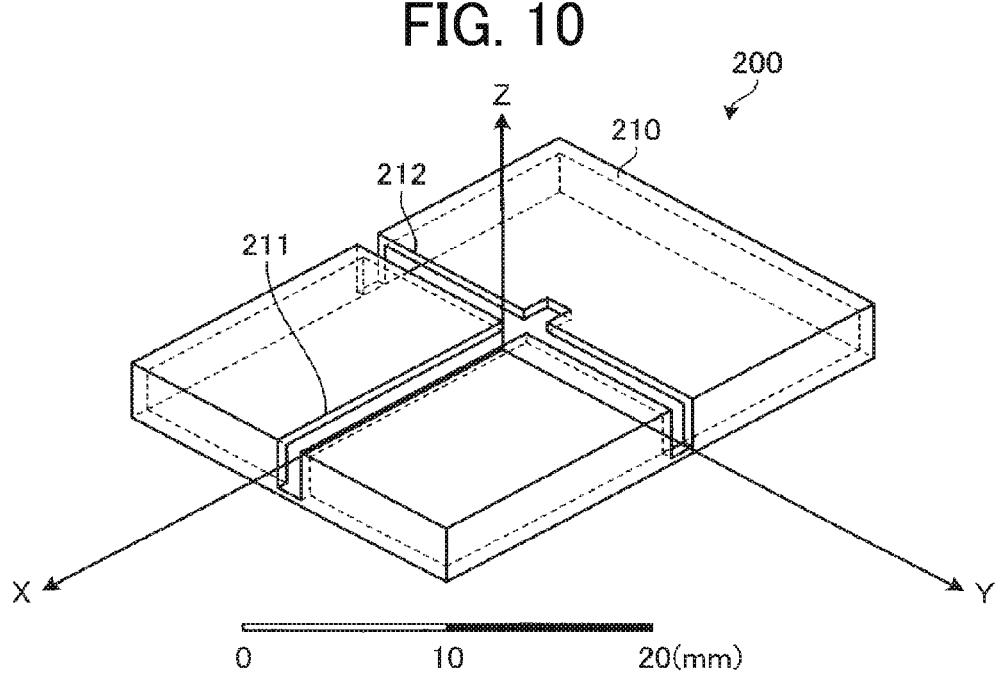
FIG. 10 is a diagram schematically illustrating an exemplary metal housing employed in the antenna unit of the second embodiment of the present disclosure.

FIG. 9 schematically illustrates an exemplary antenna unit 200 of a second embodiment of the present disclosure. FIG. 10 also schematically illustrates an exemplary metal housing 210 employed in the antenna unit 200 of the second embodiment of the present disclosure. As illustrated in the drawings, a XYZ rectangular coordinate system is applied to the antenna unit 200, and the antenna unit 200 or the like is herein below described with reference to the XYZ rectangular coordinate system. The antenna unit 200 illustrated in FIG. 9 employs a proximity magnetic field coupling system as the antenna unit 1 of the comparative example, and includes the metal housing 210 that accommodates the antenna 20 composed of the magnetic body 21 and the conducting wire 22 wound around the magnetic body 21. Since a construction and operation of the antenna 20 are similar to those of the antenna unit 1 of the comparative example, description of the antenna 20 of this embodiment is herein below omitted.

As illustrated in FIGS. 9 and 10, the metal housing 210 is again a box that contains the antenna 20 therein. The metal housing 210 is rectangular, and a length of each side (i.e., lengths in a short side direction (the direction of the Y axis), a longitudinal direction (i.e., the direction of the X axis), and a thickness direction (i.e., the direction of the Z axis)) is the same as the metal housing 110 of the antenna unit 100 of the first embodiment of the present disclosure. In addition, a position of the antenna 20 placed in the metal housing 210 is the same as that in the antenna unit 100 of the first embodiment of the present disclosure.

The metal housing 210 has a slit 211 extended in a direction of a X axis orthogonal to a direction, in which a conducting wire 22 is wound (i.e., a direction of a Y axis) to let a magnetic field generated from the antenna 20 pass through the metal housing 210. Specifically, as illustrated in FIGS. 9 and 10, the slit 211 is prepared by cutting off a plane of the metal housing 210 (i.e., a top face 210a of the metal housing 210) facing a top face (i.e., a prescribed face) of the magnetic body 21 in the direction of the X axis from an outer edge 221a of the metal housing 210. The slit 211 is further prepared by downwardly cutting off a side face 210b of the metal housing 210 from the outer edge 221a in a direction of the Z axis as well. With this, a magnetic fields generated from the antenna 20 can be emitted in the direction of the Z axis without accumulating on an inner face of the metal housing 210. A length of the slit 211 formed in the top face 210a of the metal housing 210 in the longitudinal direction (i.e., the direction of the X axis) is about 19 mm, and a length thereof in the short side direction (i.e., the direction of the Y axis) is about 1 mm, for example. Here, the outer edge 221a corresponds to a first outer edge in the present disclosure.

Further, the metal housing 210 additionally includes another slit 212 (i.e., a second cut-out) that intersects the slit 211 and extends in a conducting wire winding direction (i.e., the direction of the Y axis), in which the conducting wire is wound around the antenna 20. Specifically, as illustrated in FIGS. 9 and 10, the slit 212 is prepared by cutting off a plane (i.e., the top face 210a) of the metal housing 210 facing the top face of the magnetic body 21 in the direction of the Y axis from an outer edge 221b of the metal housing 210 to another outer edge 221c located on the opposite side to the outer edge 221b. The slit 212 is further prepared by downwardly cutting off side faces 210c and 210d of the metal housing 210 from the outer edges 221b and 221c in the direction of the Z axis, respectively. A length (or a width) of the slit 212 formed in the top face 210a of the metal housing 210 in the longitudinal direction (i.e., the direction of the X axis) is about 1 mm, and a length thereof in the short side direction (i.e., the direction of the Y axis) is about 22 mm, for example, as same as the length of the metal housing 210 in the direction of the Y axis.

In other words, the metal housing 210 is cut off to form a cruciform slit including the slits 211 and 212. Hence, when the metal housing 210 is viewed from above (i.e., in a positive direction of the Z axis) and horizontally (i.e., in a positive direction of the X axis, and positive and negative directions of the Y axis), the antenna 20 is partially visible through these slits 211 and 212. Here, as described above, the direction (i.e., the direction of the X axis) perpendicular to the direction (i.e., the direction of the Y axis), in which the conducting wire 22 is wound, corresponds to the first direction intersecting (i.e., perpendicular to) the direction, in which the conducting wire is wound. In addition, the direction (i.e., the direction of the Y axis), in which the conducting wire 22 is wound, corresponds to a second direction intersecting (or perpendicular to) the first direction as well. Further, the slit 211 is one example of the first cut-out, and the slit 212 is also one example of the second cut-out as well in the present disclosure.

Figure 11:
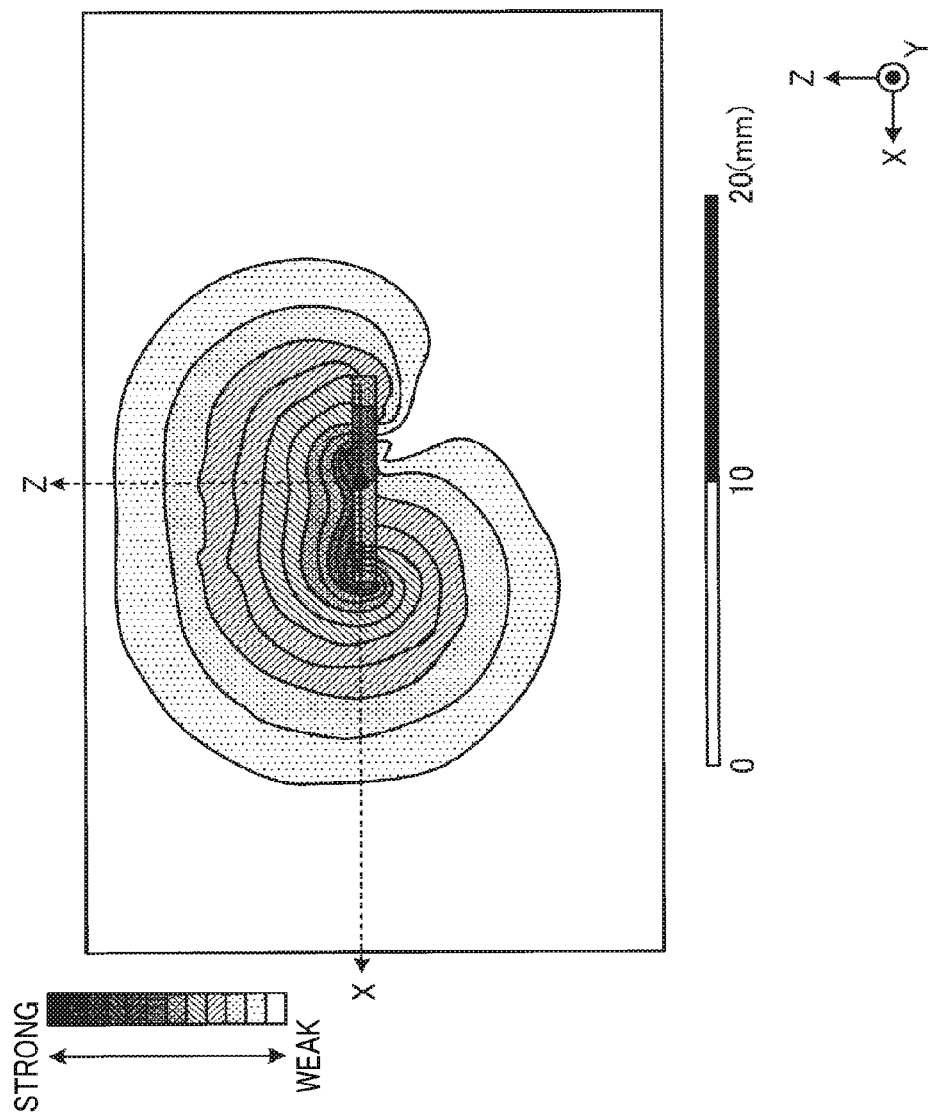
FIG. 11 is a diagram schematically illustrating a result of simulation of a magnetic field generated around the antenna unit of the second embodiment of the present disclosure.

FIG. 11 schematically illustrates a result of simulation of a magnetic field generated around the antenna unit of the second embodiment of the present disclosure. FIG. 11 is a view taken from one side of the antenna unit 200 in the direction of the Y axis, i.e., the direction A illustrated in FIG. 9. The origin of the XYZ coordinate system of FIG. 11 is located at the same position as the origin of the XYZ coordinate system of FIG. 9.

As illustrated in FIG. 11, a result of simulation of a distribution of strength of a magnetic field surrounding the antenna unit 200 is schematically illustrated. A color bar is also indicated on the upper left in FIG. 11, and represents that the darker the color, the stronger the magnetic field, and the thinner the color, the weaker the magnetic field as well. When the antenna unit 200 is compared to the antenna unit 1 of the comparative example with reference to the distributions of strength of the magnetic field illustrated in FIGS. 3 and 11, respectively, it can be seen that because the slits 211 and 212 are formed in the antenna unit 200, the magnetic field spreads out to an outside of the metal housing 210. Further, when the antenna unit 200 is again compared to the antenna unit 100 of the first embodiment of the present disclosure with reference to the distributions of strength of the magnetic field illustrated in FIGS. 7 and 11, respectively, it can be seen that because the antenna unit 200 is cut off to form a cross-shaped slit, the magnetic field can spread out to an outside of the metal housing 210. That is, the magnetic field of the antenna unit 200 is more widened than that of the antenna unit 100.

Figure 12:
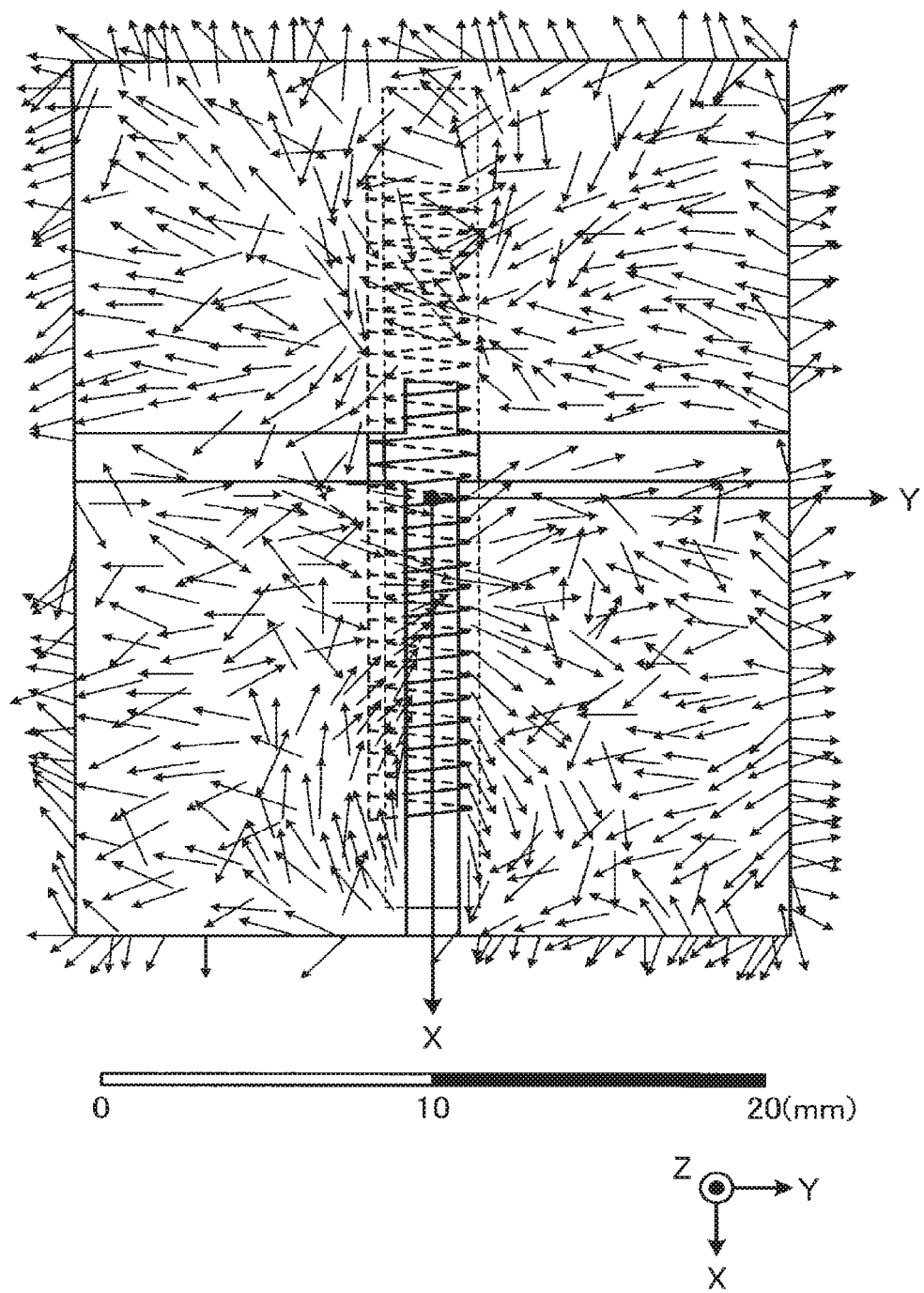
FIG. 12 is a diagram schematically illustrating a result of simulation of current density appearing around the antenna unit of the second embodiment of the present disclosure.

FIG. 12 schematically illustrates a result of simulation of current density appearing around the antenna unit 200 of the second embodiment of the present disclosure. FIG. 12 is a view taken from above the antenna unit 200 in a direction of the Z axis, i.e., a direction B illustrated in FIG. 9. The origin of the XYZ coordinate system of FIG. 12 is located at the same position as the origin of the XYZ coordinate system of FIG. 9 again. In FIG. 12, reference numerals are not assigned to the antenna and the metal housing, but are the same as those in FIG. 9, respectively.

When current density appearing on the top face 210a of the metal housing 210 is checked base on the simulation result illustrated in FIG. 12, it is found that an eddy current is interrupted by the slit 211 in the top face of the metal housing 210 located near the edge of the antenna 20, (i.e., a bottom side of the magnetic body 21 in FIG. 12). In addition, because the slit 212 is also formed in the top face 210a of the metal housing 210, current flown in the metal housing 210 in the direction of the Y axis is also interrupted by the slit 212 as well. Thus, an amount of loops of an eddy current cut in pieces in the top face 210a of the metal housing 210 increases more than that in the antenna unit 100 of the first embodiment of the present disclosure. That is, because a flow of current does not become a vortex, the antenna 20 can avoid degradation of its performance generally caused by the eddy current.

In this way, according to this embodiment of the present disclosure, since the metal housing 210 is cut off thereby forming the slits 211 and 212 in the antenna unit 200, the magnetic fields generated from the antenna 20 can pass through the metal housing 210 toward the outside of the metal housing 210 even if the antenna 20 is contained in the metal housing 210. Hence, the loops of the eddy current caused by the magnetic field that accumulates in the inner face of the metal housing 210 is subdivided, thereby blocking the eddy current. For this reason, the metal housing 210 can be employed without degrading performance of the antenna 20 while maintaining unity of design and a prescribed level of the work necessary for producing the antenna unit as well.

A third embodiment of the present disclosure is now described with reference to FIGS. 13 to 16. As described earlier, in the antenna unit 100 of the first embodiment of the present disclosure, the slit 111 is formed by cutting off the top face 110a of the metal housing 110 in the direction of the X axis from the outer edge 121a thereof. By contrast, according to this embodiment of the present disclosure, an antenna unit 300 excludes a side face thereby forming a side opening 312 in a metal housing 310. That is, the side face is removed from the metal housing 310.

Figure 13:
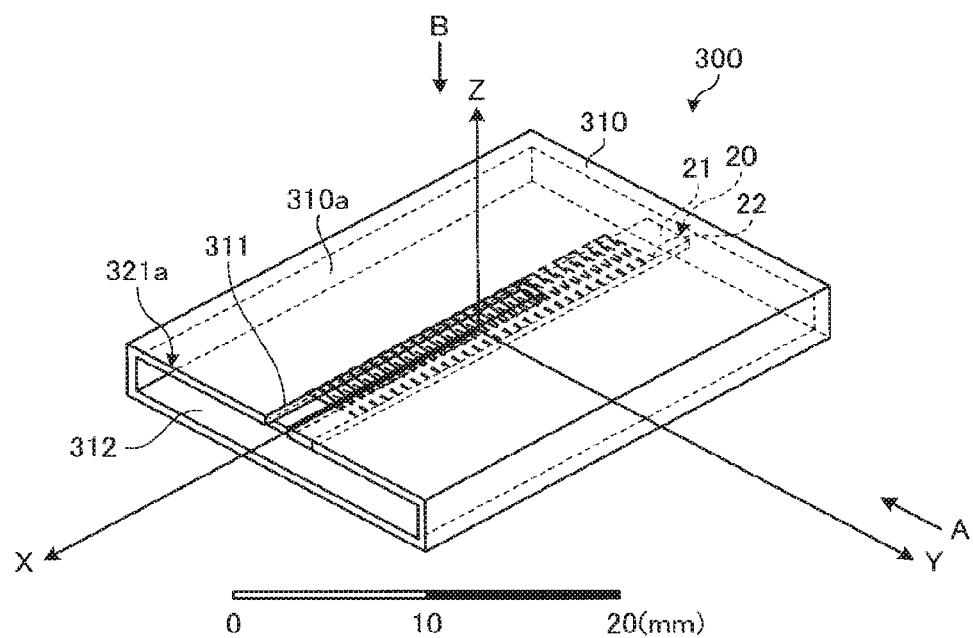
FIG. 13 is a diagram schematically illustrating an exemplary antenna unit of a third embodiment of the present disclosure.
Figure 14:
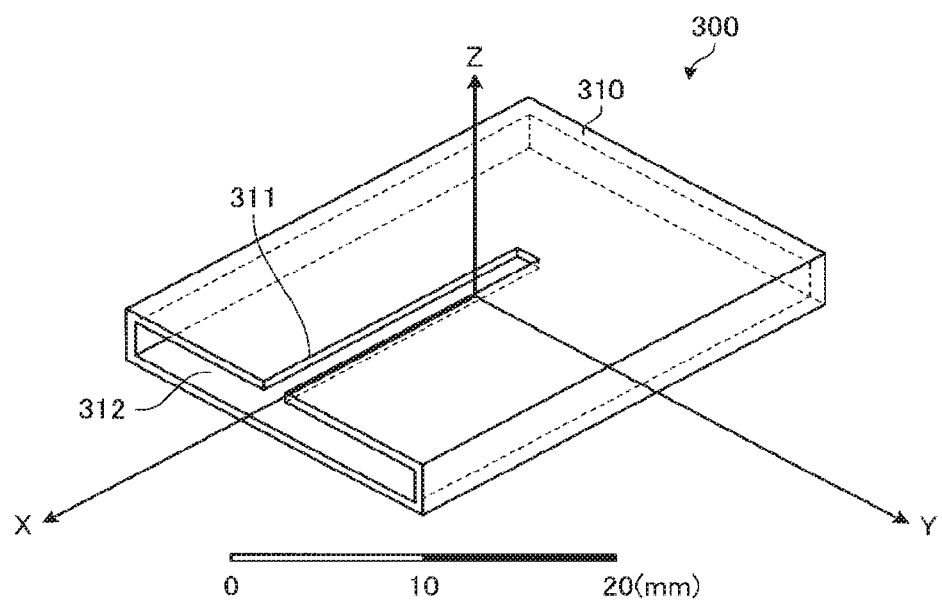
FIG. 14 is a diagram schematically illustrating an exemplary metal housing employed in the antenna unit of the third embodiment of the present disclosure.

FIG. 13 schematically illustrates an exemplary antenna unit 300 of a third embodiment of the present disclosure. FIG. 14 also schematically illustrates an exemplary metal housing 310 employed in the antenna unit 300 of the third embodiment of the present disclosure. As illustrated in FIGS. 13 and 14, a XYZ rectangular coordinate system is again applied to the antenna unit 300, and the antenna unit 300 or the like is herein below described with reference to the XYZ rectangular coordinate system. Similar to the antenna unit 1 of the comparative example, the antenna unit 300 of FIG. 13 employs the proximity magnetic field coupling system, and includes the metal housing 310 and the antenna 20 composed of the magnetic body 21 and the conducting wire 22 wound around the magnetic body 21 each accommodated in the metal housing 310. Since a construction and operation of the antenna 20 are similar to those of the antenna unit 1, description of the antenna 20 is herein below omitted.

As illustrated in FIGS. 13 and 14, the metal housing 310 is again a box that contains the antenna 20 therein. The metal housing 310 of this embodiment of the present disclosure has a rectangular shape, and a length of each side (i.e., lengths in a short side direction (i.e., a direction of the Y axis), a longitudinal direction (i.e., a direction of the X axis), and a thickness direction (i.e., a direction of the Z axis)) is the same as the metal housing 110 of the antenna unit 100 of the first embodiment of the present disclosure. The antenna 20 is placed in the same manner regarding the metal housing 210 as that in the antenna unit 100 of the first embodiment of the present disclosure.

Again, the metal housing 310 has a slit 311 extended in the direction of the X axis orthogonal to a direction in which the conducting wire 22 is wound (i.e., the direction of the Y axis) to let a magnetic field generated from the antenna 20 pass through the metal housing 310. Specifically, as illustrated in FIGS. 13 and 14, the slit 311 is prepared by cutting off a plane of the metal housing 310 (i.e., a top face 310a of the metal housing 310) facing a top face (i.e., a prescribed face) of the magnetic body 21, in the direction of the X axis from an outer edge 321a of the metal housing 310. With this, a magnetic field generated from the antenna 20 can be emitted in the direction of the Z axis without accumulating on an inner face of the metal housing 310. The metal housing 310 excludes a side face that connects with the top face 310a, on which slit 311 is formed, at the outer edge 321a. The side face is excluded at a position 312 from the metal housing 310 as illustrated in FIG. 13. A length of the slit 311 formed in the top face 310a of the metal housing 310 in a longitudinal direction (i.e., the direction of the X axis) is about 19 mm, and a length thereof in the short side direction (i.e., the direction of the Y axis) is about 1 mm, for example. Here, the outer edge 321a corresponds to a first outer edge in the present disclosure.

Since the side face is extracted from the metal housing 310 while maintaining the slit 311 therein, a T-shaped slit is thereby formed in the metal housing 310. Hence, when the metal housing 310 is viewed from above (i.e., in a positive direction of the Z axis), the antenna 20 can partially appear through the slit 311. When the metal housing 310 is viewed from a horizontal direction (i.e., a positive direction of the X axis), a side face of the antenna 20 is fully visible because the metal housing 310 does not have the side face. In the present disclosure, the direction (i.e., the direction of the X axis) perpendicular to the direction (i.e., the direction of the Y axis), in which the conducting wire 22 is wound, corresponds to a first direction intersecting (perpendicular to) the direction, in which the conducting wire 22 is wound. Further, the slit 311 is one example of a first cut-out in the present disclosure.

Figure 15:
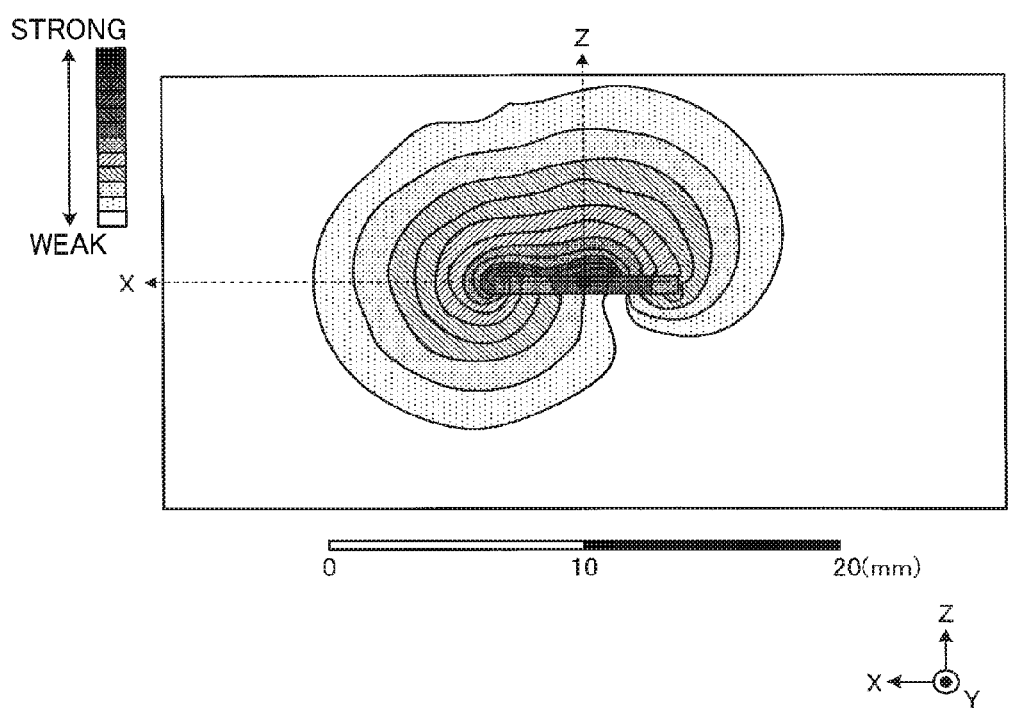
FIG. 15 is a diagram schematically illustrating a result of simulation of a magnetic field generated around the antenna unit of the third embodiment of the present disclosure.

FIG. 15 schematically illustrates a result of simulation of a magnetic field generated around the antenna unit 300 of the third embodiment of the present disclosure. Again, FIG. 15 is a view taken from one side of the antenna unit 300 in a direction of the Y axis, i.e., a direction A illustrated in FIG. 13. The origin of the XYZ coordinate system of FIG. 15 is located at the same position as the origin of the XYZ coordinate system of FIG. 13.

FIG. 15 schematically illustrates a result of simulation of distribution of strength of a magnetic field surrounding the antenna unit 300. Similar to FIG. 3, a color bar is indicated on the left in FIG. 13 and represents that the darker the color, the stronger the magnetic field. In addition, the thinner the color, the weaker the magnetic field as well. When the antenna unit 300 is compared to the antenna unit 1 of the comparative example with reference to the distributions of strength of the magnetic field illustrated in FIGS. 3 and 15, respectively, it can be seen that because the slit 111 is formed and the side face is omitted from the antenna unit 300, the magnetic field spreads out to an outside of the metal housing 310. Further, when the antenna unit 300 is again compared to the antenna unit 100 of the first embodiment of the present disclosure with reference to the distributions of strength of the magnetic field illustrated in FIGS. 7 and 15, respectively, it can be seen that because the antenna unit 300 is cut off to form the T-shaped slit (i.e., the side face is removed) therein, a greater amount of magnetic field can spread out to the outside of the metal housing 310 and the magnetic field of the antenna unit 300 is more widened than that of the antenna unit 100. That is, as illustrated in FIG. 15, the magnetic field especially spreads (in the positive direction of the X axis) from a side of the metal housing 310, in which the side face is omitted therefrom. Hence, a spreading shape of the magnetic field in this embodiment is different from that in the second embodiment of the present disclosure, in which the cross-shaped slit composed of the slits 211 and 212 is formed.

Figure 16:
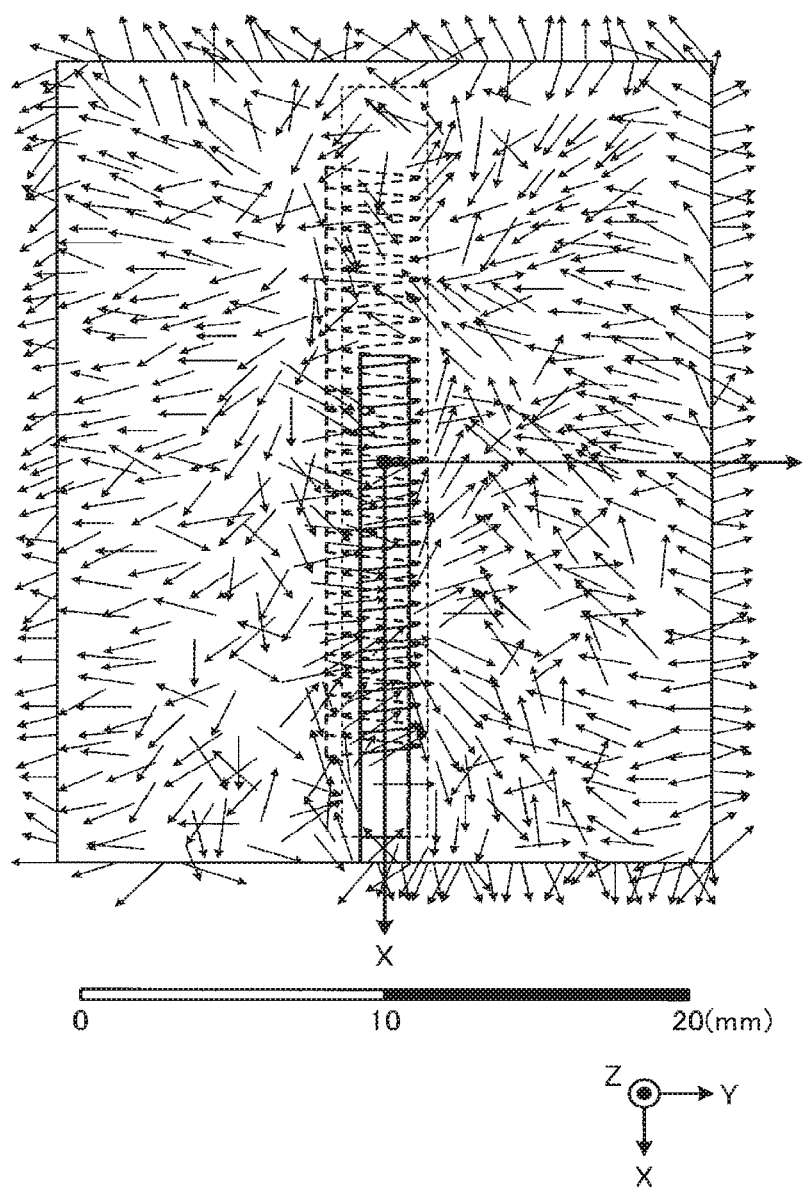
FIG. 16 is a diagram schematically illustrating a result of simulation of current density appearing around the antenna unit of the third embodiment of the present disclosure.

FIG. 16 schematically illustrates a result of simulation of current density appearing around the antenna unit 300 of the third embodiment of the present disclosure. That is, FIG. 16 is a view taken from above the antenna unit 300 in a direction of the Z axis, i.e., a direction B illustrated in FIG. 13. Again, the origin of the XYZ coordinate system of FIG. 16 is located at the same position as the origin of the XYZ coordinate system of FIG. 13. In FIG. 16, reference numerals are not assigned to the antenna and the metal housing, but are the same as those in FIG. 13, respectively.

Based on the simulation result illustrated in FIG. 16, when current density appearing on a top face 310a of the metal housing 310 is checked, it is found that an eddy current is interrupted by the slit 311 on the face of the metal housing 310 located near the edge of the antenna 20, at which the slit 211 is formed and the side face is extracted (i.e., a bottom side of the magnetic body 21 in FIG. 16). It is further found that an amount of loops of an eddy current cut in pieces in the top face 310a of the metal housing 310 is greater than that in the antenna unit 100 of the first embodiment of the present disclosure. That is, because current flows without generating a vortex, degradation of performance of the antenna 20 generally caused by the eddy current can be avoided.

In this way, according to this embodiment of the present disclosure, because the metal housing 310 is cut off thereby forming the slit 311 while removing the side face of the antenna unit 300, the magnetic field generated from the antenna 20 can pass through the metal housing 310 toward the outside of the metal housing 310 even if the antenna 20 is contained in the metal housing 310. Hence, loops of the eddy current caused by the magnetic field that accumulates in the inner face of the metal housing 310 are subdivided, thereby blocking the eddy current. For this reason, the metal housing 310 can be employed without degrading performance of the antenna 20 while maintaining unity of design and a prescribed level of work necessary for producing the antenna unit as well.

A fourth embodiment of the present disclosure is now described with reference to FIGS. 17 to 20. As described earlier, in the antenna unit 100 of the first embodiment of the present disclosure, the slit 111 is formed by cutting off the top face 110a of the metal housing 110 in the direction of the X axis from the outer edge 121a thereof. By contrast, in this embodiment of the present disclosure, an antenna unit 400 additionally includes two more slits formed on side faces of the metal housing 410, respectively.

Figure 17:
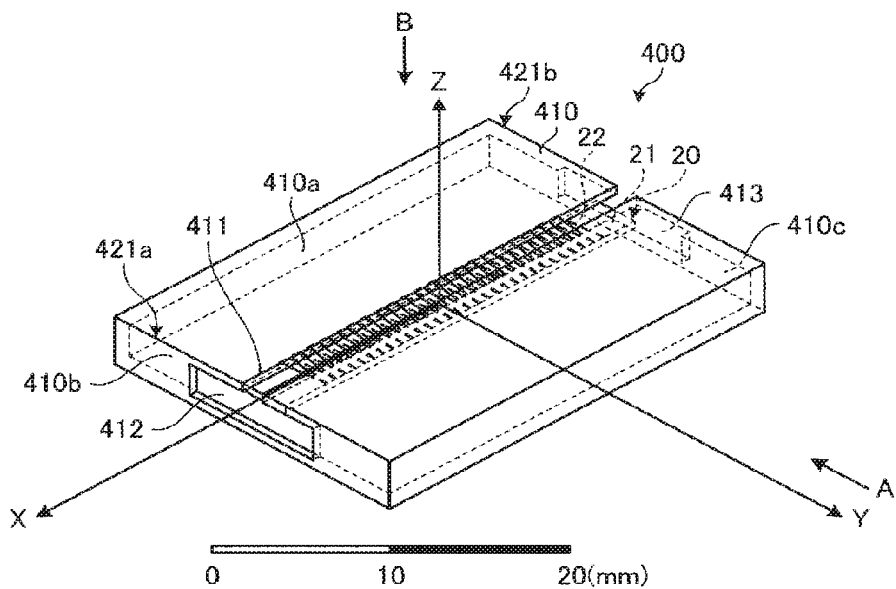
FIG. 17 is a diagram schematically illustrating an exemplary antenna unit of a fourth embodiment of the present disclosure.
Figure 18:
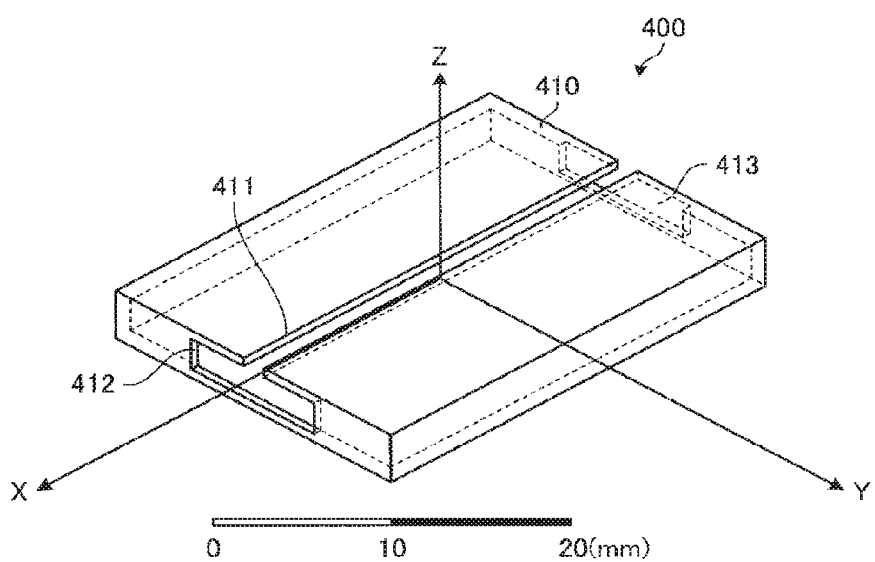
FIG. 18 is a diagram schematically illustrating an exemplary metal housing employed in the antenna unit of the fourth embodiment of the present disclosure.

That is, FIG. 17 schematically illustrates an exemplary antenna unit 400 of a fourth embodiment of the present disclosure. FIG. 18 also schematically illustrates an exemplary metal housing 410 employed in the antenna unit 400 of the fourth embodiment of the present disclosure. Again, as illustrated in FIGS. 17 and 18, a XYZ rectangular coordinate system is applied to the antenna unit 400, and the antenna unit 400 or the like is herein below described with reference to the XYZ rectangular coordinate system. Similar to the antenna unit 1 of the comparative example, the antenna unit 400 of FIG. 17 employs the proximity magnetic field coupling system, and includes the metal housing 410 and the antenna 20 composed of the magnetic body 21 and the conducting wire 22 wound around the magnetic body 21 each accommodated in the metal housing 410. Since a construction and operation of the antenna 20 are similar to those of the antenna unit 1 of the comparative example, description of the antenna 20 of this embodiment is herein below omitted.

As illustrated in FIGS. 17 and 18, the metal housing 410 is again a box that contains the antenna 20 therein. The metal housing 410 is rectangular, and a length of each side (i.e., lengths of a short side direction (i.e., the direction of the Y axis), a longitudinal direction (i.e., the direction of the X axis), and a thickness direction (i.e., the direction of the Z axis)) is the same as the metal housing 110 of the antenna unit 100 of the first embodiment of the present disclosure. In addition, a position of the antenna 20 placed in the metal housing 410 is the same as that in the antenna unit 100 of the first embodiment of the present disclosure.

The metal housing 410 has a slit 411 extended in a direction of the X axis orthogonal to a direction, in which a conducting wire 22 is wound (i.e., a direction of the Y axis) to let a magnetic field generated from the antenna 20 pass through the metal housing 410. Specifically, as illustrated in FIGS. 17 and 18, the slit 411 is prepared by cutting off a plane of the metal housing 410 (i.e., a top face 410a of the metal housing 410) facing the top face (i.e., a prescribed face) of the magnetic body 21 in the direction of the X axis from one outer edge 421a to another outer edge 421b opposed to the one outer edge 421a of the metal housing 110. Another slit 412 (i.e., a third cut-out) is also formed in a side face 410b of the metal housing 410, which borders the top face 410a, in which the slit 411 is formed, at an outer edge 421a. Yet another slit 413 (i.e., a fourth cut-out) is also formed in a side face 410c that borders the top face 410a at an outer edge 421b. With this, a magnetic field generated from the antenna 20 can be emitted in the direction of the Z axis without accumulating on an inner face of the metal housing 410. A length of the slit 411 formed in the top face 410a of the metal housing 410 in a longitudinal direction (i.e., the direction of the X axis) is about 30 mm and a length thereof in the short side direction (i.e., the direction of the Y axis) is about 1 mm, for example. Here, the outer edge 421a corresponds to the first outer edge in the present disclosure. The outer edge 421b corresponds to the second outer edge in the present disclosure.

Accordingly, in the metal housing 410 of this embodiment of the present disclosure, these slits 411, 412, and 413 collectively constitute an I-shaped slit. When the metal housing 410 is viewed from above (i.e., the positive direction of the Z axis), the antenna 20 partially appears through the slit 411. When the metal housing 410 is viewed from one side in the horizontal direction (i.e., positive and negative directions of the X axis), a side face of the antenna 20 entirely appears through each of the slits 412 and 413 as well. In the present disclosure, a direction (i.e., the direction of the X axis) perpendicular to a direction (i.e., the direction of the Y axis), in which the conducting wire 22 is wound, corresponds to a first direction intersecting (or perpendicular to) the direction, in which the conducting wire is wound. Further, in the present disclosure, the slit 411 is one example of a first cut-out. The slit 412 is also one example of a third cut-out. The slit 413 is again one example of a fourth cut-out as well.

Figure 19:
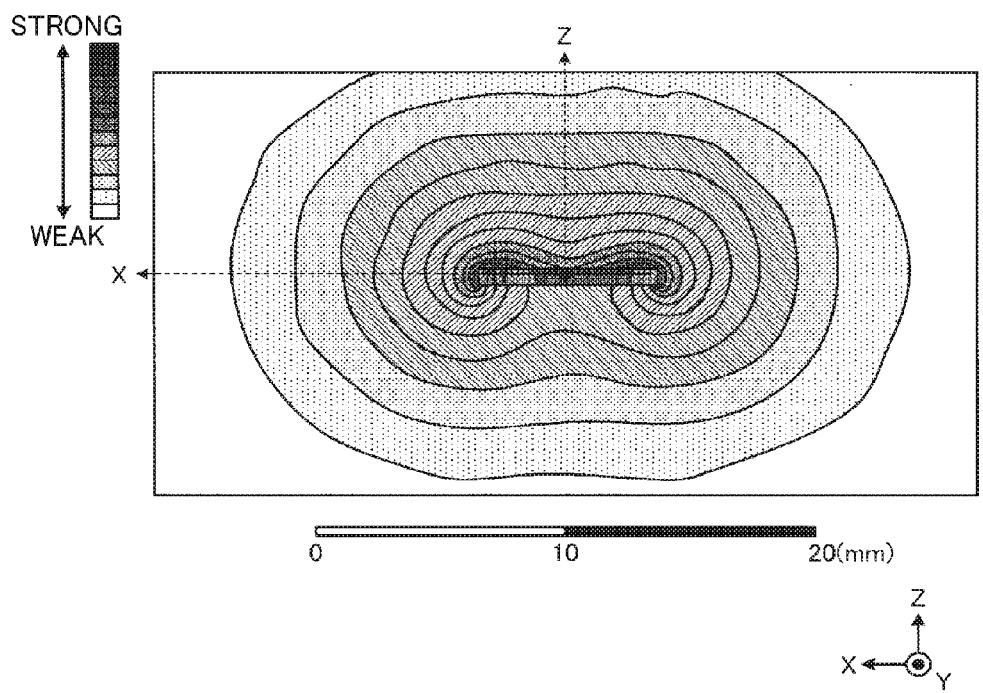
FIG. 19 is a diagram schematically illustrating a result of simulation of a magnetic field generated around the antenna unit of the fourth embodiment of the present disclosure.

FIG. 19 schematically illustrates a result of simulation of a magnetic field generated around the antenna unit 400 of the fourth embodiment of the present disclosure. Here, FIG. 19 is a view taken from one side of the antenna unit 400 in a direction of the Y axis (i.e., a direction A illustrated in FIG. 17). The origin of the XYZ coordinate system of FIG. 19 is located at the same position as the origin of the XYZ coordinate system of FIG. 17.

Specifically, FIG. 19 schematically illustrates a result of simulation of distribution of strength of a magnetic field surrounding the antenna unit 400. Similar to FIG. 3, a color bar is indicated on the left in FIG. 19, and represents that the darker the color, the stronger the magnetic field. In addition, the thinner the color, the weaker the magnetic field as well. When the antenna unit 400 is compared to the antenna unit 1 with reference to the distributions of strength of the magnetic field illustrated in FIGS. 3 and 19, respectively, it can be seen that because the slits 411, 412, and 413 are formed in the antenna unit 400, the magnetic field spreads out to an outside of the metal housing 410. Further, when the antenna unit 400 is compared again to the antenna unit 100 of the first embodiment of the present disclosure with reference to the distributions of strength of the magnetic field illustrated in FIGS. 7 and 19, respectively, it can be seen that because the antenna unit 400 is cut off to form the I-shaped slit, a greater amount of magnetic flux is discharged to an outside far from the metal housing 410. That is, the magnetic field of the antenna unit 400 is more widened than that of the antenna unit 100.

Figure 20:
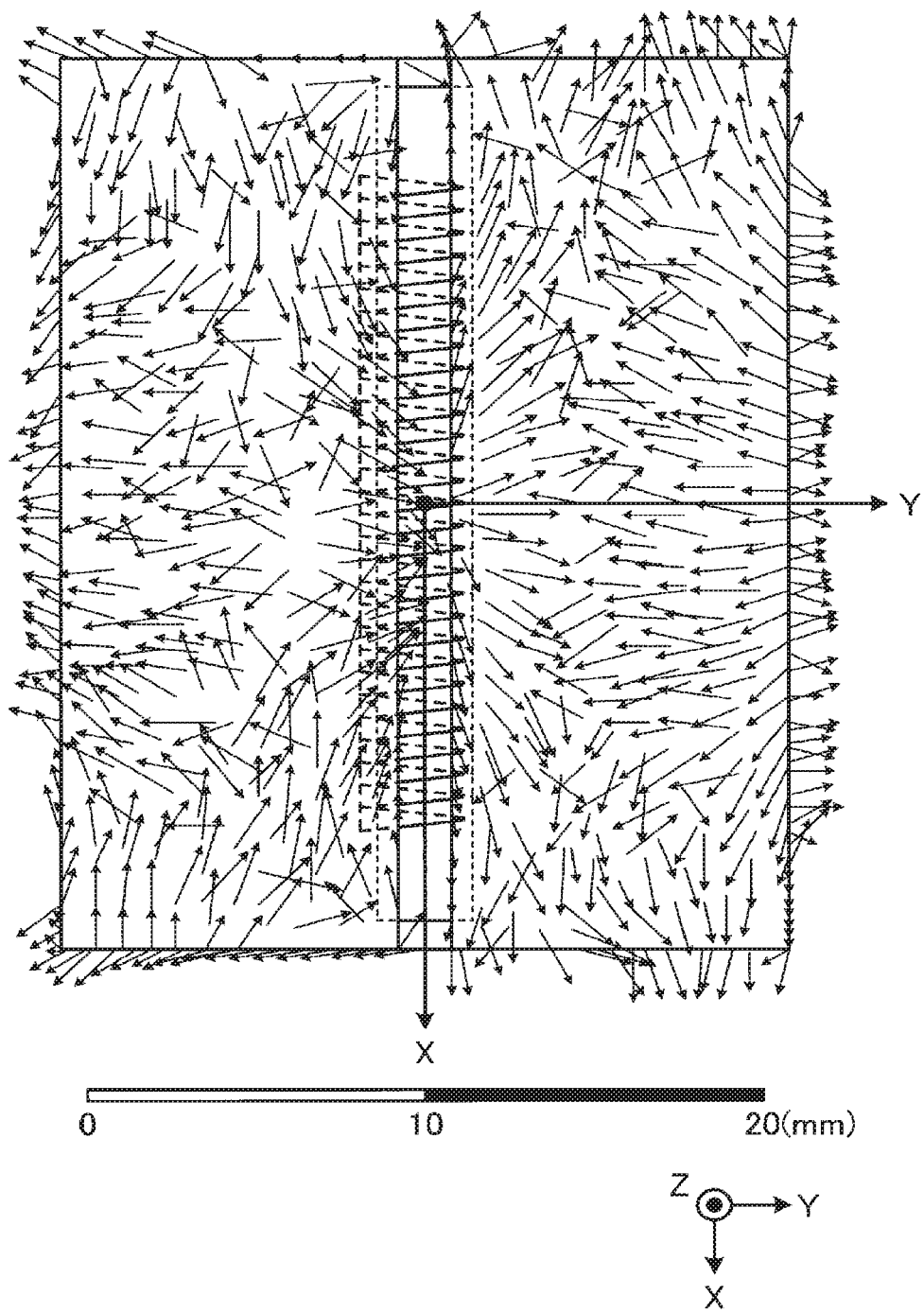
FIG. 20 is a diagram schematically illustrating a result of simulation of current density appearing around the antenna unit of the fourth embodiment of the present disclosure.

FIG. 20 schematically illustrates a result of simulation of current density appearing around the antenna unit of the fourth embodiment of the present disclosure. Specifically, FIG. 20 is a view taken from above the antenna unit 400 in a direction of the Z axis (i.e., a direction B illustrated in FIG. 17). The origin of the XYZ coordinate system of FIG. 20 is also located at the same position as the origin of the XYZ coordinate system of FIG. 17.

Based on the simulation result illustrated in FIG. 20, when current density appearing on a top face 410a of the metal housing 410 is checked, it is found that an eddy current is interrupted by the slit 411 on each of the faces of the metal housing 410 located near both edges of the antenna 20 (i.e., top and bottom sides of the magnetic body 21 in FIG. 20), respectively. It is also found that because the slits 412 and 413 are additionally formed in the side faces of the metal housing 410, respectively, an amount of loops of the eddy current cut in pieces on the top face 410a of the metal housing 410 is greater than that in the antenna unit 100 of the first embodiment of the present disclosure. That is, because current flows without generating a vortex, degradation of performance of the antenna 20 generally caused by the eddy current can be avoided.

In this way, according to this embodiment of the present disclosure, because the metal housing 410 is cut off thereby forming the slits 411, 412, and 413 in the antenna unit 400, the magnetic field generated from the antenna 20 can pass through the metal housing 410 and spreads to the outside of the metal housing 410 even if the antenna 20 is contained in the metal housing 410. That is, loops of the eddy current caused by the magnetic field that accumulates in the inner face of the metal housing 410 are subdivided, thereby blocking the eddy current. For this reason, the metal housing 410 can be employed without degrading performance of the antenna 20 while maintaining unity of design and a prescribed amount of work necessary for producing the antenna unit as well.

Numerous additional modifications and variations of the present disclosure are possible in light of the above teachings. It is therefore to be understood that within the scope of the appended claims, the present disclosure may be executed otherwise than as specifically described herein. For example, the antenna unit is not limited to the above-described various embodiments and may be altered as appropriate. Similarly, the communication system is not limited to the above-described various embodiments and may be altered as appropriate. Further, the method of producing an antenna unit is not limited to the above-described various embodiments and may be altered as appropriate. In particular, an order of various steps of the method of producing an antenna unit the image forming method is not limited to the above-described various embodiments and may be altered as appropriate.

What is claimed is:

1. An antenna unit, comprising:
an antenna including a magnetic body and a conducting wire wound around the magnetic body; and
a metal housing to accommodate the antenna,
wherein the metal housing includes a first cut-out to allow a magnetic field generated by the antenna to pass through the metal housing; and
the first cut-out extends from a first outer edge of the metal housing by a prescribed length in a first direction perpendicular to a direction in which the conductive wire is wound around the magnetic body.

2. The antenna unit according to claim 1, wherein the antenna employs a near magnetic field coupling system to execute wireless communication with and wireless power supply to an external device.

3. The antenna unit according to claim 1, wherein the metal housing is a rectangular box.

4. The antenna unit according to claim 3, wherein the antenna is placed on a bottom of the metal housing aligned in the first direction below the first cut-out, and
wherein central axes of the first cut-out and the antenna aligned in the first direction are located on the same vertical plane.

5. The antenna unit according to claim 4, wherein a width of an opening of the first cut-out is smaller than a width of the antenna.

6. The antenna unit according to claim 3, wherein the metal housing further includes a second cut-out intersecting and perpendicular to the first cut-out.

7. The antenna unit according to claim 6, wherein the first cut-out and the second cut-out are formed by cutting off a top face of the metal housing.

8. The antenna unit according to claim 6, wherein the second cut-out extends in a second direction from one edge to another edge of a top face of the metal housing.

9. The antenna unit according to claim 8, wherein the second cut-out continuously extends to lateral side faces across the one edge and said another edge of the metal housing, respectively.

10. The antenna unit according to claim 3, wherein the metal housing is open at a side that borders on a plane on which the first cut-out is formed at the first outer edge of the metal housing.

11. The antenna unit according to claim 3, wherein the first cut-out extends from the first outer edge to a second outer edge opposite to the first outer edge of the metal housing in the first direction, and
wherein the metal housing further includes:
a third cut-out formed in a first side face that borders on a plane on which the first cut-out is formed at the first outer edge, and
a fourth cut-out formed in a second side face that borders on the plane on which the first cut-out is formed at the second outer edge.

12. A communication system comprising:
the antenna unit as claimed in claim 1, and
a communication device connected to the antenna unit to communicate with an external device.

13. The communication system according to claim 12, wherein the communication system executes wireless communication with and wireless power supply to the external device, and the antenna employs a near magnetic field coupling system.

14. A method of producing an antenna unit, comprising:
winding conducting wire around a magnetic body multiple times at a prescribed pitch to prepare an antenna;
installing the antenna in a metal housing at a prescribed position; and
forming a first cut-out in the metal housing by cutting off a prescribed top face portion of the metal housing along the magnetic body in a first direction to allow a magnetic field generated by the antenna to pass through the metal housing,
wherein the first cut-out extends from a first outer edge of the metal housing by a prescribed length in a first direction perpendicular to a direction in which the conductive wire is wound around the magnetic body.

15. The method according to claim 14, further comprising:
extracting a side face of the metal housing to allow the magnetic field generated by the antenna to pass through the metal housing from the inside to the outside of the metal housing.

16. The method according to claim 14, further comprising:
forming a second cut-out intersecting and perpendicular to the first cut-out by cutting off another portion of the top face of the metal housing from one edge to another edge of the metal housing to allow the magnetic field generated by the antenna to pass through the metal housing.

17. An antenna unit, comprising:
an antenna including a magnetic body and a conducting wire wound around the magnetic body; and
a metal housing to accommodate the antenna,
wherein the metal housing includes a first cut-out to allow a magnetic field generated by the antenna to pass through the metal housing; and
the antenna employs a near magnetic field coupling system to execute wireless communication with and wireless power supply to an external device.

* * * * *